Nov. 11, 1924.

C. H. HODGKINS 1,515,203

STARTING MECHANISM FOR AUTOMOBILES

Original Filed Dec. 30, 1920

WITNESSES:

INVENTOR
Charles H. Hodgkins.
BY
ATTORNEY

Patented Nov. 11, 1924.

1,515,203

UNITED STATES PATENT OFFICE.

CHARLES H. HODGKINS, OF PITTSBURGH, PENNSYLVANIA, ASSIGNOR TO WESTINGHOUSE ELECTRIC & MANUFACTURING COMPANY, A CORPORATION OF PENNSYLVANIA.

STARTING MECHANISM FOR AUTOMOBILES.

Application filed December 30, 1920, Serial No. 434,060. Renewed April 15, 1924.

*To all whom it may concern:*

Be it known that I, CHARLES H. HODGKINS, a subject of the King of Great Britain, and a resident of Pittsburgh, in the county of Allegheny and State of Pennsylvania, have invented a new and useful Improvement in Starting Mechanisms for Automobiles, of which the following is a specification.

My invention relates to starting mechanisms for automobiles and, particularly, to starting mechanisms wherein pinions are moved axially into mesh with engine gear wheels.

One object of my invention is to provide a starting mechanism that shall move a motor pinion axially into mesh with an engine gear wheel in a simple and efficient manner and that shall be provided with suitable means for absorbing the shocks occasioned either upon clashing of the gear teeth or upon starting of the engine.

In operating a starting mechanism of the type having a pinion moved axially into mesh with an engine gear wheel, care must be taken to prevent damage to the teeth in case the pinion and gear teeth meet end to end. Moreover, it is desirable to protect the starting mechanism against the shock which is occasioned by the sudden placing of the load of actuating the engine on the motor.

My invention is an improvement upon the starting mechanism disclosed in the application of Charles H. Hodgkins, and Carl H. Kindl, Serial No. 331,599, filed Oct. 18, 1919, and assigned to the Westinghouse Electric & Manufacturing Company.

The present invention provides means not only for absorbing any shock which may be encountered by the clashing of the gear teeth or the meeting of the pinion teeth end to end with the teeth of the engine gear wheel, but also provides means for relieving the starting mechanism of the shock which may occur upon the initial actuation of the engine.

More specifically, one mechanism for practicing my invention comprises a motor pinion which is rotatably and slidably mounted on the shaft of the starting motor and which is moved axially into mesh with the engine gear wheel. A spring serves to absorb shocks caused by clashing between the gear teeth, and a friction clutch serves to relieve the starting mechanism of the shocks incident to the sudden application of torque to the engine.

Figure 1:
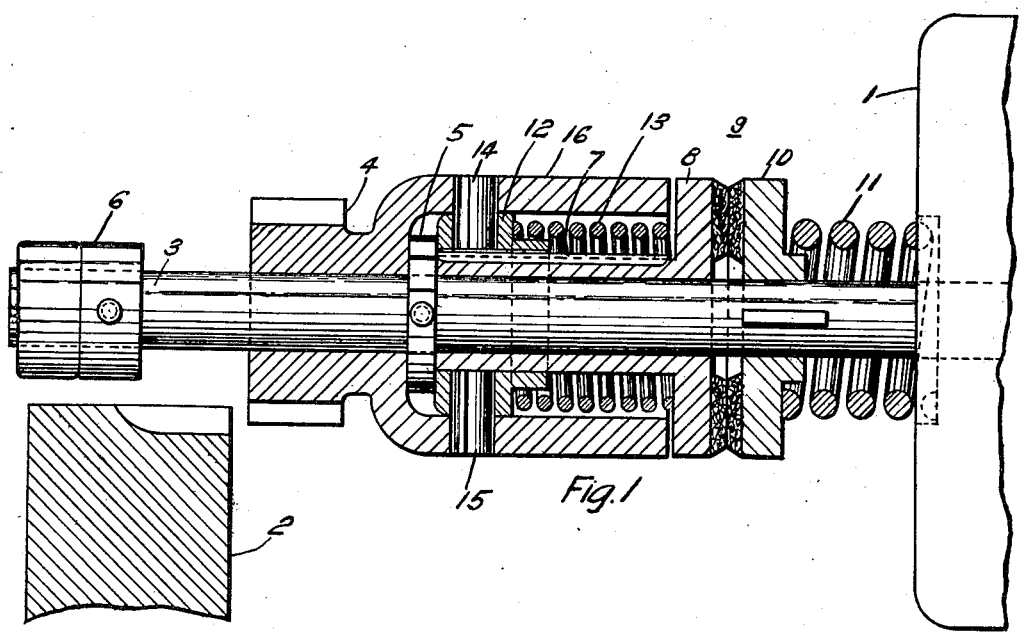
Figure 1 is a sectional elevational view of a starting mechanism constructed in accordance with my invention.

Referring to Fig. 1 of the drawing, a starting motor 1 is provided for operating an internal-combustion engine (not shown), by means of an engine gear wheel 2. The motor 1 is provided with a shaft 3 upon which the pinion 4 is slidably and rotatably mounted. The axial movement of the pinion 4 is limited, in one direction, by a fixed collar member 5 and, in the opposite direction, by a second fixed collar member 6.

A sleeve member 7, which is rotatably mounted on the motor shaft 3 adjacent to the fixed collar 5, is preferably integral with a friction disc 8 of a clutch 9. The second disc 10 of the clutch 9 is slidably mounted on the shaft 3 and is keyed thereto in any suitable manner. A relatively heavy spring 11, which is mounted on the motor shaft 3 between the friction disc 10 and the motor armature, serves to hold the two discs of the friction clutch in engagement with each other.

A collar member 12, which is slidably mounted on the sleeve 7, is resiliently held in engagement with the fixed collar 5 by means of a relatively light spring 13. The spring 13 is mounted on the sleeve 7 between the collar 12 and the friction disc 8. The spring 13 serves to absorb any shock which is incident to the clashing of the pinion teeth with the teeth on the engine gear wheel. The collar 12 is keyed to the sleeve 7 in any suitable manner and is provided with two pins 14 and 15 for a purpose to be hereinafter set forth.

A pinion sleeve member 16, which is preferably integral with pinion 4, is provided with two slots 17 and 18, into which the pins 14 and 15 project. The pins 14 and 15 have a cam action upon the sides of the slots 17 and 18 and serve to effect movement of the pinion 4 along the motor shaft 3.

In the structure above set forth, it will be noted that the collar 12, which is splined to the sleeve member 7, is connected to the motor shaft 3 through the friction clutch 9. Consequently, upon starting of the motor, the pins 14 and 15 are rotated with the motor shaft 3 and act upon the sleeve 16 which is joined to the motor pinion 4.

Upon rotation of the motor in a clockwise direction, as viewed from the left, the inertia of the pinion 4 and the sleeve member 16 tend to maintain such members stationary. The collar 12 and the pins 14 and 15 are compelled to rotate with the motor shaft by the connection through the friction clutch above described. Consequently, the pins 14 and 15 engage the sides of the slots 17 and 18 and exert a cam action which forces the pinion 4 towards the left, as viewed in Fig. 1 of the drawing, into mesh with the engine gear wheel 2. The slots 17 and 18 may be formed at any desired angle in order to obtain any desired movement of the pinion.

If the pinion teeth meet the engine gear wheel teeth end to end, the shock of such engagement is not augmented by the torque of the motor, the torque being absorbed by the relatively light spring 13 until the teeth register for meshing. The cam action of the pins 14 and 15 and the respective inclined surfaces causes the pins and the sleeve member 12 to be actuated to the right, as viewed in the drawing, to compress the spring 13. Moreover, the spring 13 serves to hold the pinion 4 in engagement with the engine gear wheel 2 until the teeth register and meshing is effected.

When the motor pinion 4 meshes with the engine gear wheel 2, the load of overcoming the inertia of the engine, which is suddenly placed upon the starting motor, produces a shock that is absorbed by the friction clutch 9. The friction clutch is so adjusted that it transmits ample force for rotating the engine shaft after the inertia of the engine has been partially overcome but yields to a certain degree when the torque of the rapidly rotating motor is suddenly applied to the stationary engine. The relatively light spring 13 is of insufficient strength to absorb such shock. The spring 11, which holds the friction plates 8 and 10 in engagement with each other, is preferably of such strength as to be substantially unyielding under the conditions set forth above, and, therefore, of no utility either in protecting the pinion and gear wheel teeth in case of clashing or in absorbing the shock due to starting the engine.

When the engine is started and the gear wheel 2 is operated at a speed greater than that of the motor pinion 4, the pinion is moved towards the right, as shown in the drawing, by reason of the cam action between the slots 17 and 18 and the pins 14 and 15, to demesh the pinion from the engine gear wheel.

Figure 2:
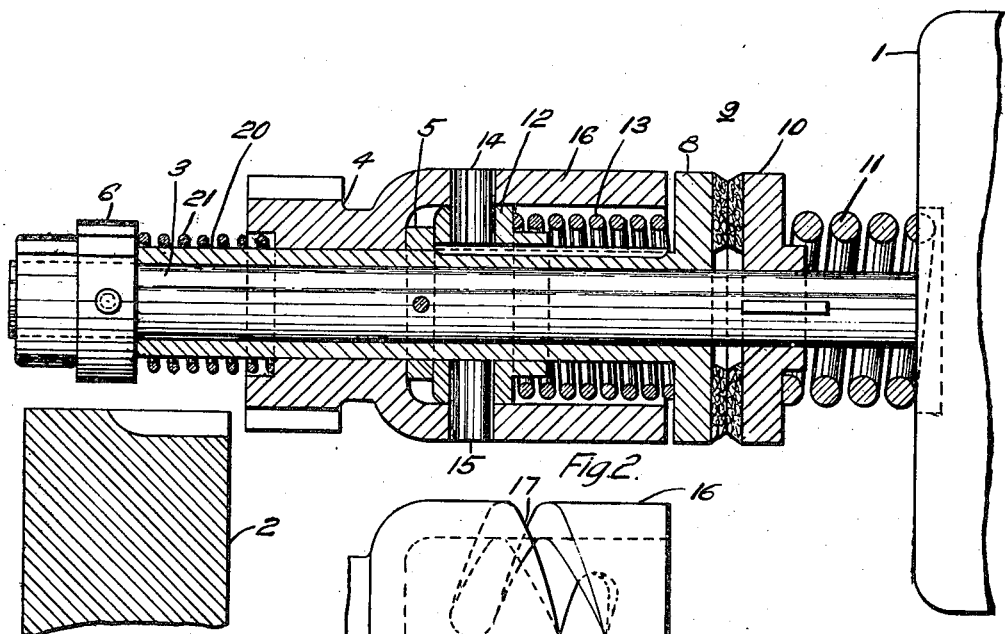
Fig. 2 is a modification of the starting mechanism shown in Fig. 1.
Figure 3:
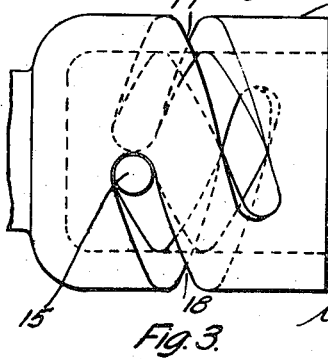
Fig. 3 is a view of the pin-and-slot connection shown in Fig. 1.

Inasmuch as the starting mechanism disclosed in Fig. 2 is very similar to the starting mechanism disclosed in Fig. 1, corresponding parts have been referred to by similar reference characters.

In the mechanism disclosed in Fig. 2, the friction disc 8 of the clutch 9 is attached to a sleeve member 20 which extends through the collar member 5 and into engagement with the collar member 6. The collar member 5, in such case, is fixedly mounted upon the sleeve 20, and the pinion 4 is rotatably and slidably mounted on such sleeve member. Preferably a relatively light spring 21 is disposed on the sleeve member 20 between the pinion and the fixed sleeve 6 for preventing any creeping action of the pinion.

The collar 12 is slidably mounted on the sleeve member 20 and is keyed thereto in any suitable manner. The spring member 13 serves, as in the starting mechanism above described, to normally maintain the collar member 12 in engagement with the fixed collar 5. The starting mechanism shown in Fig. 2 of the drawing operates in a manner similar to the starting mechanism shown in Fig. 1, and, acordingly, it is deemed unnecessary to describe the operation of the second starting mechanism in detail. The starting mechanism shown in Fig. 2 is only adapted for service wherein a large motor pinion may be used, inasmuch as the motor pinion is somewhat weakened by reason of the relatively large bore incident to its being mounted on the sleeve 20.

In the starting mechanisms above described, each of such mechanisms is protected by a relatively light spring in case the pinion teeth clash with the teeth of the engine gear wheel, and each mechanism is protected by a friction clutch during the cranking operation. It should also be noted that the light spring also serves to hold the pinion in engagement with the engine gear wheel until meshing of the teeth has been effected.

Modifications in the mechanism and in the arrangement and location of parts may be made within the spirit and scope of my invention and such modifications are intended to be covered by the appended claims.

I claim as my invention:

1. In a starting mechanism, the combination with a motor, a pinion mounted on the shaft of said motor, and an engine gear wheel, of a collar fixedly mounted on the motor shaft for limiting the movement of said pinion, a sleeve member engaging said collar and forming a portion of a friction clutch, a second portion of the clutch resiliently held in engagement with the first portion of the clutch, said second portion of the clutch being rotatable with, and slidably mounted on, the motor shaft, and a pin-and-slot connection between the pinion and said sleeve member.

2. In a starting mechanism, the combination with a motor shaft and a pinion mounted for longitudinal and rotary movement thereon, of a friction clutch comprising a member having a sleeve portion integral therewith that is operatively connected to said pinion and comprising, also, a second clutch member that is slidably keyed to said shaft.

3. In a starting mechanism, the combination with a motor shaft and a pinion mounted for longitudinal and rotary movement thereon, of a friction clutch comprising a member having a sleeve portion, a pin-and-slot connection between said pinion and said sleeve portion, said clutch comprising, also, a second member that is slidably keyed to said shaft.

4. In a starting mechanism, the combination with a motor shaft and a pinion mounted for longitudinal and rotary movement thereon, said pinion having a hollow member connected thereto, of a sleeve member having a cam connection to said hollow member, and a friction clutch for operatively connecting said shaft to said sleeve member.

5. In a starting mechanism, the combination with a motor shaft and a pinion mounted for longitudinal and rotary movement thereon, said pinion having a hollow member connected thereto, of a sleeve member having a cam connection to said hollow member, a friction clutch for operatively connecting said shaft to said sleeve member and a spring within said hollow member for absorbing shocks incident to the movement of said pinion.

6. In a starting mechanism, the combination with a motor shaft and a pinion mounted for longitudinal and rotary movement relatively thereto, of means comprising a friction clutch for operatively connecting said pinion to said shaft, the members of said clutch being slidably mounted on said shaft and one of said members being rotatable with said shaft, and a member fixed on said shaft for limiting the longitudinal movements of said pinion and one of said clutch members.

In testimony whereof, I have hereunto subscribed my name this 10th day of December 1920.

CHARLES H. HODGKINS.